(12) United States Patent
Cho et al.

(10) Patent No.: US 12,322,813 B2
(45) Date of Patent: Jun. 3, 2025

(54) SECONDARY BATTERY

(71) Applicant: SAMSUNG SDI CO., LTD., Yongin-si (KR)

(72) Inventors: Seong Bong Cho, Yongin-si (KR); Jeong Wook Yi, Yongin-si (KR); Eui Kwang Jeong, Yongin-si (KR); Hyun Ki Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 534 days.

(21) Appl. No.: 17/853,034

(22) Filed: Jun. 29, 2022

(65) Prior Publication Data
US 2023/0006289 A1 Jan. 5, 2023

(30) Foreign Application Priority Data
Jun. 30, 2021 (KR) .................. 10-2021-0085720

(51) Int. Cl.
*H01M 50/145* (2021.01)
*H01M 50/169* (2021.01)
(Continued)

(52) U.S. Cl.
CPC ....... *H01M 50/145* (2021.01); *H01M 50/169* (2021.01); *H01M 50/536* (2021.01); *H01M 50/547* (2021.01); *H01M 50/627* (2021.01)

(58) Field of Classification Search
CPC ............. H01M 50/145; H01M 50/169; H01M 50/547; H01M 50/536; H01M 50/627
See application file for complete search history.

(56) References Cited

U.S. PATENT DOCUMENTS 7,927,732 B2   4/2011   Myerberg et al.
8,389,154 B2   3/2013   Myerberg et al.
(Continued)

FOREIGN PATENT DOCUMENTS

KR   10-2005-0103645 A   11/2005
KR   10-0855182           8/2008
(Continued)

OTHER PUBLICATIONS

Guen, Rechargeable Battery, Mar. 2023, See the Abstract. (Year: 2012).*

(Continued)

*Primary Examiner* — Anca Eoff
*Assistant Examiner* — Monique M Wills
(74) *Attorney, Agent, or Firm* — Womble Bond Dickinson (US) LLP

(57) ABSTRACT

A secondary battery includes: an electrode assembly including a first electrode plate, a second electrode plate, and a separator; a case including a first side having an opening to accommodate the electrode assembly; a cap plate sealing the first side of the case; a first current collector plate arranged between the electrode assembly and the cap plate and electrically connecting the first electrode plate and the cap plate; a terminal arranged on a second side of the case; a second current collector plate electrically connecting the second electrode plate and the terminal; a first welding portion on an outer surface of the cap plate and welding the cap plate and the first current collector plate; and a second welding portion on the outer surface of the cap plate and welding the case and the cap plate.

8 Claims, 2 Drawing Sheets

(51) Int. Cl.
  *H01M 50/536* (2021.01)
  *H01M 50/547* (2021.01)
  *H01M 50/627* (2021.01)

(56) References Cited

U.S. PATENT DOCUMENTS

| | | |
|---|---|---|
| 2002/0034680 A1 | 3/2002 | Inoue et al. |
| 2005/0238951 A1 | 10/2005 | Yoo et al. |
| 2007/0117011 A1 | 5/2007 | Myerberg et al. |
| 2010/0216001 A1 | 8/2010 | Byun et al. |
| 2011/0212360 A1 | 9/2011 | Myerberg et al. |
| 2019/0386270 A1 | 12/2019 | Lee et al. |
| 2021/0151837 A1 | 5/2021 | Shimizu et al. |

FOREIGN PATENT DOCUMENTS

| | | | | |
|---|---|---|---|---|
| KR | 10-2010-0096720 A | | 9/2010 | |
| KR | 20120025854 A | * | 3/2012 | .......... H01M 10/058 |
| KR | 10-2018-0127938 A | | 11/2018 | |
| KR | 10-2020-0007273 | | 1/2020 | |
| WO | WO 2007/028152 A2 | | 3/2007 | |

OTHER PUBLICATIONS

European Search Report dated Nov. 25, 2022 issued in corresponding European Application No. 22181477.5 (8 pages).
Korean Office Action dated Apr. 24, 2023 issued in corresponding Korean Patent Application No. 10-2021-0085720 (5 pages).

\* cited by examiner

SECONDARY BATTERY

CROSS-REFERENCE TO RELATED APPLICATION

This application claims priority to and the benefit of Korean Patent Application No. 10-2021-0085720, filed on Jun. 30, 2021 in the Korean Intellectual Property Office, the entire content of which is herein incorporated by reference.

BACKGROUND

1. Field

Aspects of embodiments of the present disclosure relate to a secondary battery.

2. Description of the Related Art

Unlike primary batteries which are not rechargeable, secondary batteries can be charged and discharged. Low-capacity secondary batteries are widely employed in small-sized portable electronic devices, such as smartphones, feature phones, tablet computers, notebook computers, digital cameras, camcorders, etc., while large-capacity secondary batteries are commonly used for driving motors of hybrid automobiles, electric automobiles, etc.

The secondary battery may include an electrode assembly including positive and negative electrodes, a case, or can, that accommodates the electrode assembly, terminals connected to the electrode assembly, and other components. Secondary batteries may be classified into cylindrical, prismatic, and pouch types, according to the shape.

The above information disclosed in this Background section is provided for enhancement of understanding of the background of the invention and, therefore, it may contain information that does not constitute prior art.

SUMMARY

According to an aspect of embodiments of the present disclosure, a secondary battery having improved safety is provided.

A secondary battery according to one or more embodiments of the present disclosure may include: an electrode assembly including a first electrode plate, a second electrode plate, and a separator; a case including a first side having an opening to accommodate the electrode assembly; a cap plate sealing the first side of the case; a first current collector plate arranged between the electrode assembly and the cap plate and electrically connecting the first electrode plate and the cap plate; a terminal arranged on a second side of the case; a second current collector plate electrically connecting the second electrode plate and the terminal; a first welding portion on an outer surface of the cap plate and welding the cap plate and the first current collector plate; and a second welding portion on the outer surface of the cap plate and welding the case and the cap plate.

In one or more embodiments, the case may include a stepped portion on which the first current collector plate is seated.

In one or more embodiments, the first current collector plate may include a first region in contact with the first electrode plate, and a second region in contact with the cap plate, and be elastically deformably bent such that the first region has a height difference with respect to the second region.

In one or more embodiments, the cap plate may have an electrolyte injection hole formed therein.

In one or more embodiments, the secondary battery may further include a corrosion preventer covering at least one of the first welding portion and the second welding portion.

In one or more embodiments, the corrosion preventer covers each of the first welding portion and the second welding portion.

In one or more embodiments, the corrosion preventer may be applied on at least one of the first welding portion and the second welding portion.

In one or more embodiments, a groove may be formed in a region corresponding to at least one of the first welding portion and the second welding portion.

DETAILED DESCRIPTION

Figure 1:
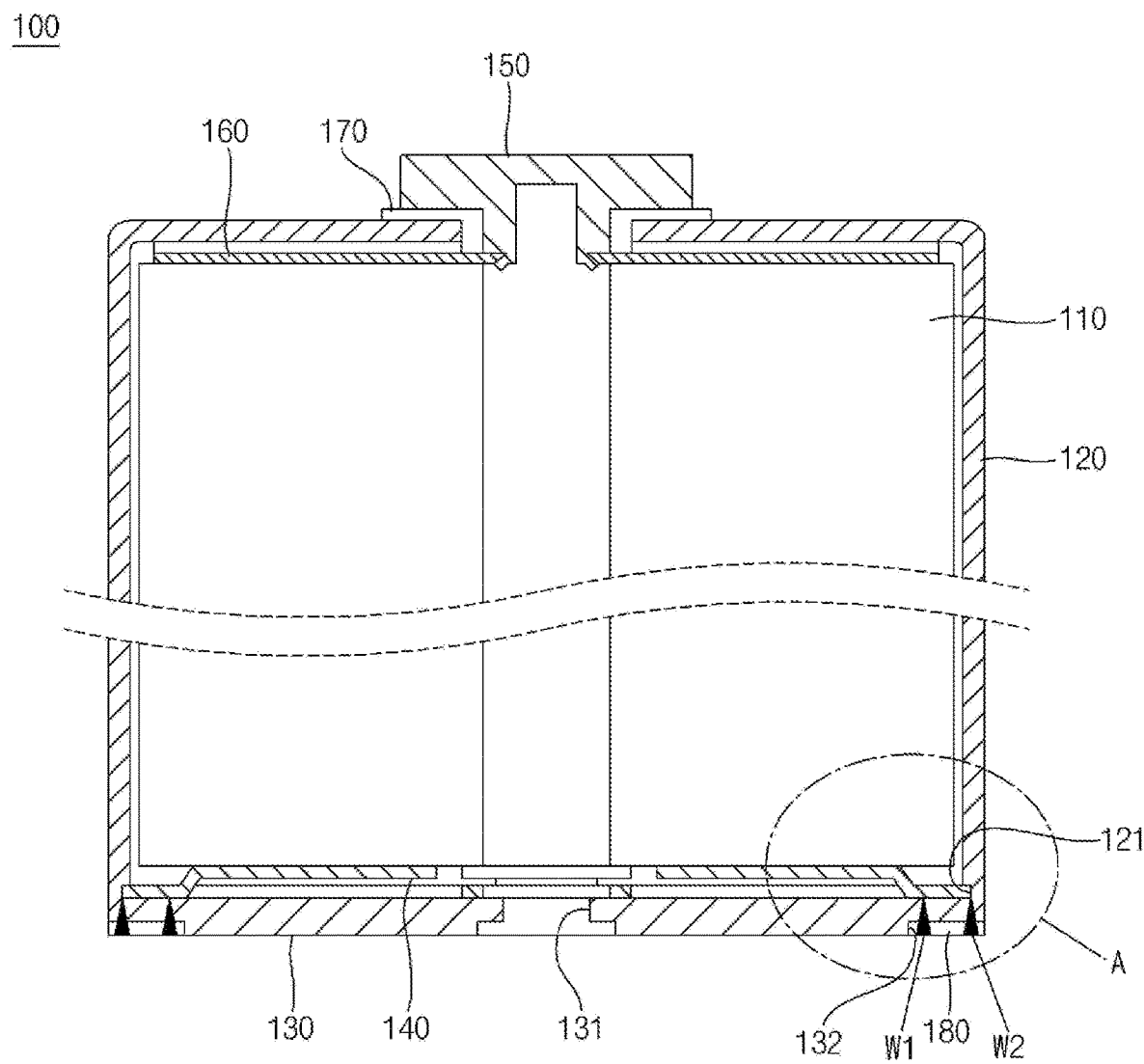
FIG. 1 is a schematic cross-sectional view of a secondary battery according to an embodiment of the present disclosure.

Herein, some embodiments of the present disclosure will be described in further detail with reference to the accompanying drawings.

Embodiments of the present disclosure are provided to more completely explain the present disclosure, and the following embodiments may be embodied in many different forms and should not be construed as being limited to the embodiments set forth herein. Rather, these example embodiments are provided so that this disclosure will be thorough and complete and will convey aspects and features of the present disclosure to a person skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Figure 2:
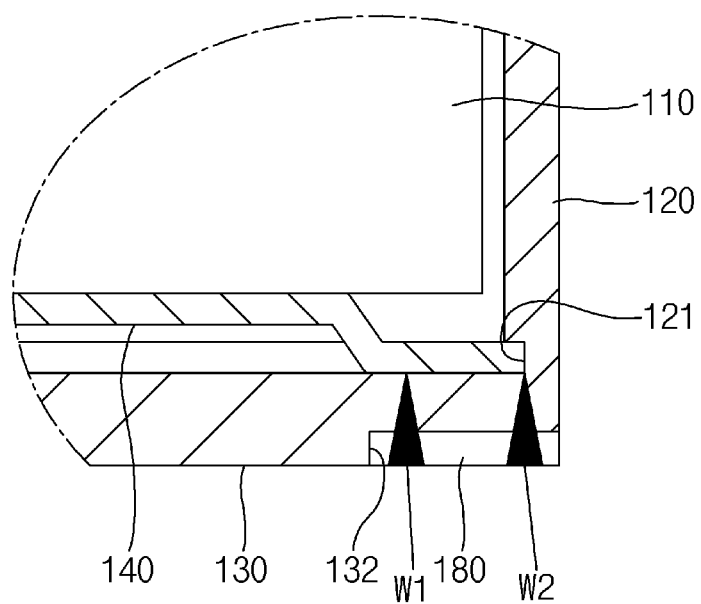
FIG. 2 is an enlarged view of a region "A" in FIG. 1.
Figure 3:
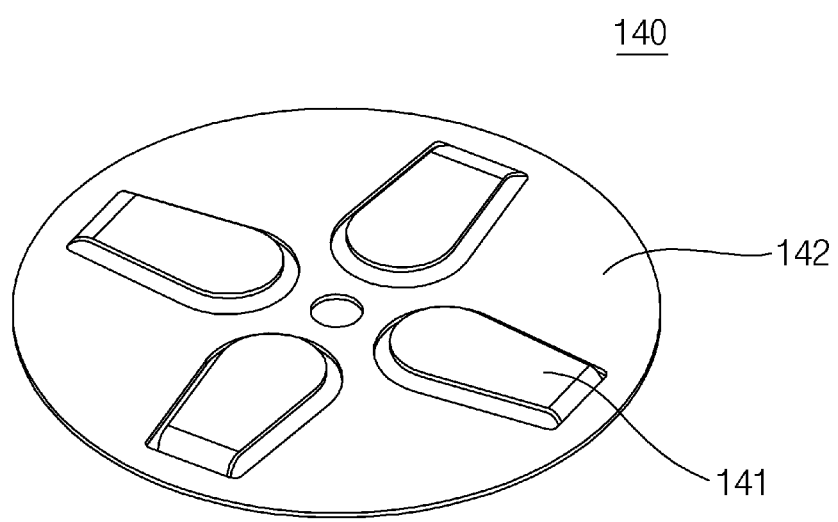
FIG. 3 is a perspective view of a first current collector plate of a secondary battery according to an embodiment of the present disclosure.

FIG. 1 is a schematic cross-sectional view of a secondary battery according to an embodiment of the present disclosure; FIG. 2 is an enlarged view of a region "A" in FIG. 1; and FIG. 3 is a perspective view of a first current collector plate of a secondary battery according to an embodiment of the present disclosure.

Referring to FIGS. 1 and 2, a secondary battery 100 according to an embodiment of the present disclosure includes an electrode assembly 110, a case, or can, 120, a cap plate 130, a first current collector plate 140, a terminal 150, a second current collector plate 160, and a gasket 170. In addition, the secondary battery 100 according to an embodiment of the present disclosure may further include a corrosion preventer 180.

The electrode assembly 110 includes a first electrode plate, a second electrode plate, and a separator.

The first electrode plate may be any one of a negative electrode plate and a positive electrode plate. When the first electrode plate is a negative electrode plate, the first electrode plate may include, for example, but is not limited to, a negative electrode coating portion in which a negative electrode active material is coated on a negative electrode current collector plate made of a thin conductive metal plate, for example, copper or nickel foil or mesh, and a negative electrode non-coating portion in which a negative electrode active material is not coated. Here, the negative active material may be made of, for example, but is not limited to, a carbon-based material, Si, Sn, tin oxide, a tin alloy composite, a transition metal oxide, lithium metal nitride, or a metal oxide.

The second electrode plate may be the other one of the negative electrode plate and the positive electrode plate. As described above, when the first electrode plate is a negative electrode plate, the second electrode plate may be a positive electrode plate. In this case, the second electrode plate may include a positive electrode coating portion in which a positive electrode active material is coated on a positive electrode current collector plate made of a thin metal plate having excellent conductivity, for example, aluminum foil or mesh, and a positive electrode non-coating portion in which a positive electrode active material is not coated. Here, the positive electrode active material may be, for example, but is not limited to, a chalcogenide compound, for example, a composite metal oxide, such as $LiCoO_2$, $LiMn_2O_4$, $LiNiO_2$, $LiNiMnO_2$, or the like.

The separator is interposed between the first electrode plate and the second electrode plate to prevent or substantially prevent a short circuit between the first electrode plate and the second electrode plate. The separator may be made of, for example, but is not limited to, polyethylene, polypropylene, a porous copolymer of polyethylene and polypropylene, and the like.

The electrode assembly 110 may be stacked, for example, in such a manner that the lower end of the first electrode plate protrudes lower than the lower end of the second electrode plate, and the upper end of the second electrode plate protrudes higher than the upper end of the first electrode plate, and thus may be wound in the form of a jelly roll.

In an embodiment, the case 120 is shaped of a cylinder having a surface open to accommodate the electrode assembly 110 and another surface (e.g., an opposite surface) closed. FIG. 1 illustrates that the lower surface is open and the upper surface is closed, but the upper surface may be open and the lower surface may be closed, as desired. However, for purposes of understanding, as shown in the drawing, the following description will be made with respect to a case in which the upper surface is closed and the lower surface is open.

The cap plate 130 is shaped to correspond to the lower surface of the case 120, for example, in a disk shape, and serves to seal the lower surface of the case 120.

The first current collector plate 140 is disposed between the electrode assembly 110 and the cap plate 130 inside the case 120, and electrically connects the first electrode plate of the electrode assembly 110 and the cap plate 130 to each other. As described above, when the first electrode plate of the electrode assembly 110 is a negative electrode plate, the cap plate 130 in contact with the first current collector plate 140 and the case 120 in contact with the cap plate 130 will have a negative polarity.

In an embodiment, the case 120, the cap plate 130, and the first collector plate 140 may be bonded to each other by welding, for example, laser welding. To this end, first, in a state in which the electrode assembly 110 is installed in the case 120, the first current collector plate 140 is disposed under the case 120 so as to allow the first current collector plate 140 to be in contact with the first electrode plate of the electrode assembly 110. Next, the lower surface of the case 120 is closed with the cap plate 130 so as to allow the cap plate 130 to be in contact with the first current collecting plate 140. Thereafter, a laser is irradiated to an outer surface of the cap plate 130 from the outside of the cap plate 130 to weld the cap plate 130 and the first current collector plate 140. Herein, the resulting welding portion provided on the outer surface of the cap plate 130 is referred to as a first welding portion W1. Next, a laser is irradiated to the outer surface of the cap plate 130, more specifically, to a boundary region between the case 120 and the cap plate 130, from the outside of the cap plate 130, to weld the case 120 and the cap plate 130. Herein, the resulting welding portion provided on the outer surface of the cap plate 130 is referred to as a second welding portion W2.

If a laser were irradiated from an inside of the case 120 to an inner peripheral surface of the case 120 or an inner surface of the first current collector plate 140, spatters may be generated during welding and remain inside the case 120, thereby lowering safety. However, in the secondary battery 100 according to an embodiment of the present disclosure, the first welding portion W1 and the second welding portion W2 are provided on the outer surface of the cap plate 130, that is, after the lower surface of the case 120 is closed with the cap plate 130, a laser is irradiated to the outer surface of the cap plate 130 from the outside of the cap plate 130 to weld the first current collector plate 140 and the cap plate 130, and, thus, even if spatters are generated during welding, the spatters can be prevented or substantially prevented from being introduced into the case 120, and the spatters can be easily suctioned and removed by using a separate suctioning device (not shown).

Although it has been described above that the cap plate 130 and the first current collector plate 140 are first welded and the case 120 and the cap plate 130 are then welded, the case 120 and the cap plate 130 may first be welded and the cap plate 130 and the first current collector plate 140 may then be welded, as desired. Alternatively, the case 120 and the cap plate 130 may be welded at the same time as the cap plate 130 and the first current collecting plate 140 are welded.

In an embodiment, a stepped portion 121 may be formed at a lower portion of the case 120 so as to allow the first current collecting plate 140 and the cap plate 130 to be stably disposed with respect to the case 120. For example, as a whole, that is, above the stepped portion 121, an inner diameter of the case 120 may be smaller than outer diameters of the first current collecting plate 140 and the cap plate 130, while the inner diameter of the stepped portion 121 may be substantially the same as the outer diameters of the first current collecting plate 140 and the cap plate 130. Accordingly, the first current collecting plate 140 may be disposed under the case 120 so as to allow the first current collecting plate 140 to be seated on the stepped portion 121, and the lower surface of the case 120 may be closed with the cap plate 130 so as to allow the cap plate 130 to be in close contact with the first current collecting plate 140. Thereafter, by pressing and welding the cap plate 130 by using a separate jig (not shown), for example, a gap between parts may be eliminated and welding quality can be improved.

In an embodiment, referring to FIG. 3, the first current collecting plate 140 may have a structure in which a first region (e.g., an entire region) 141 is cut and bent with respect to a second region 142. In an embodiment, the first current collector plate 140, which includes the first region 141 mainly in contact with the first electrode plate of the electrode assembly 110 and the second region 142 mainly in contact with the cap plate 130, may be constructed so as to be elastically deformably bent to allow the first region 141 to have a height difference (e.g., a vertical offset) with respect to the second region 142. Accordingly, even if tolerances occur in the electrode assembly 110, the case 120, the cap plate 130, the first current collector plate 140, etc. during manufacturing, the first region 141 may come into close contact with the first electrode plate of the electrode assembly 110 and the second region 142 may come into close contact with the cap plate 130, through the flexible first current collector plate 140, while the cap plate 130 may be assembled so as to be arranged substantially on the same plane as the lower surface of the case 120 (the cross-section of the lower end of the case 120).

In an embodiment, the cap plate 130 may or may not have an electrolyte injection hole 131 formed therein. FIG. 1 illustrates that the electrolyte injection hole 131 is formed. If the electrolyte injection hole 131 is formed, as described above, the process may be carried out such that the lower surface of the case 120 is closed with the cap plate 130, and, after welding the first current collector plate 140 and the cap plate 130, and then welding the case 120 and the cap plate 130, the electrolyte is injected through the electrolyte injection hole 131, and the electrolyte injection hole 131 is then sealed. If the electrolyte injection hole 131 is not formed, the process may be carried out such that, before the lower surface of the case 120 is closed with the cap plate 130, the electrolyte is injected through the lower surface of the case 120.

When the cap plate 130 is made of a material containing an iron component, for example, steel, corrosion may easily occur in the first and second welds W1 and W2 due to oxidation after welding. In an embodiment, to prevent or substantially prevent this, at least one of the first welding portion W1 and the second welding portion W2, and, in an embodiment, the first welding portion W1 and the second welding portion W2, may be covered by using the corrosion preventer 180 so as not to be exposed to the outside. The corrosion preventer 180 may be, for example, a rust preventing agent applied on the first welding portion W1 and the second welding portion W2. In an embodiment, to limit an area to which the rust preventing agent is to be applied, the cap plate 130 may have a groove 132 formed in regions corresponding to the first welded portion W1 and the second welded portion W2. In another embodiment, the corrosion preventer 180 may be, for example, a cover member that covers the first and second welding portions W1 and W2.

The terminal 150 is installed on the upper surface of the case 120. FIG. 1 illustrates that, in an embodiment, the terminal 150 is installed in a rivet manner. That is, a hole is formed in the upper surface of the case 120, such that the terminal 150 is disposed through the hole and is fixed by supporting the upper end thereof at an upper side of the case 120, and supporting the lower end thereof at a lower side of the second current collecting plate 160. Here, the second current collector plate 160 electrically connects the second electrode plate of the electrode assembly 110 and the terminal 150 to each other, and the gasket 170 is installed between the case 120 and the terminal 150 to insulate the case 120 and the terminal 150 from each other. Therefore, in an embodiment, the terminal 150 has a positive polarity. However, configuring the positive electrode terminal in this way is merely an example, and the protection scope of the present disclosure is not limited thereto. For example, a person skilled in the art will easily understand that the positive electrode terminal can be configured in a different manner with reference to conventional cylindrical secondary batteries.

As described above, according to an aspect of one or more embodiments of the present disclosure, after closing one side of the case by means of the cap plate, a laser is irradiated to the outer surface of the cap plate from the outside of the cap plate, to weld the case, the cap plate, the first electrode plate, etc. to one another, and, as a result, a welding portion is provided on the outer surface of the cap plate, thereby providing a secondary battery capable of preventing or reducing the possibility that spatters are generated during welding and remain inside the case.

In addition, by omitting mechanical bonding using conventional crimping, beading, etc., the capacity can be increased, compared to the same size cell, and sealing strength can also be increased.

While some example embodiments for carrying out the secondary battery according to the present disclosure have been described herein, the present disclosure is not limited to the example embodiments, and it will be understood by a person skilled in the art that various changes in form and details may be made therein without departing from the spirit and scope of the present disclosure as set forth by the following claims.

What is claimed is:

1. A secondary battery comprising:
   an electrode assembly comprising a first electrode plate, a second electrode plate, and a separator;
   a case comprising a first side having an opening to accommodate the electrode assembly;
   a cap plate sealing the first side of the case;
   a first current collector plate arranged between the electrode assembly and the cap plate and electrically connecting the first electrode plate and the cap plate;
   a terminal arranged on a second side of the case;
   a second current collector plate electrically connecting the second electrode plate and the terminal;
   a first welding portion on an outer surface of the cap plate and welding the cap plate and the first current collector plate; and
   a second welding portion on the outer surface of the cap plate and welding the case and the cap plate.

2. The secondary battery of claim 1, wherein the case comprises a stepped portion on which the first current collector plate is seated.

3. The secondary battery of claim 1, wherein the first current collector plate comprises a first region in contact with the first electrode plate, and a second region in contact with the cap plate, and is elastically deformably bent such that the first region has a height difference with respect to the second region.

4. The secondary battery of claim 1, wherein the cap plate has an electrolyte injection hole formed therein.

5. The secondary battery of claim 1, further comprising a corrosion preventer covering at least one of the first welding portion and the second welding portion.

6. The secondary battery of claim 5, wherein the corrosion preventer covers each of the first welding portion and the second welding portion.

7. The secondary battery of claim 5, wherein the corrosion preventer is applied on at least one of the first welding portion and the second welding portion.

8. The secondary battery of claim 5, wherein the cap plate has a groove formed in a region corresponding to the at least one of the first welding portion and the second welding portion.

* * * * *